THIN-FILM MEMORY WITH TWO OUTPUT LINES

Filed May 5, 1964 2 Sheets-Sheet 1

INVENTOR
ETSUO KASHIWAGI
BY
Hopgood & Calimafde
ATTORNEYS

INVENTOR
ETSUO KASHIWAGI
BY
Hopgood & Calimafde
ATTORNEYS

United States Patent Office 3,383,665

Patented May 14, 1968

3,383,665

THIN-FILM MEMORY WITH TWO OUTPUT LINES

Etsuo Kashiwagi, Tokyo, Japan, assignor to Nippon Electric Company Limited, Tokyo, Japan, a corporation of Japan Filed May 5, 1964, Ser. No. 365,015
Claims priority, application Japan, June 8, 1963, 38/30,252
5 Claims. (Cl. 340—174)

This invention relates to magnetic thin-film memory elements, and also to an array which utilizes a plurality of such elements.

At present, it is extremely difficult, from a manufacturing engineering standpoint, to manufacture a large number of magnetic thin-film elements which have only minor magnetic characteristic differences from one another, although they may have magnetic characteristics adequate for use individually as memory elements. This provides an obstacle for the production of magnetic thin-film memory devices at low cost, requiring the production of a relatively large number of magnetic thin-film memory elements in order to obtain a given number of elements having the necessary similar magnetic characteristics. As a result, there is a need for a magnetic thin-film memory array having a construction that is capable of utilizing magnetic thin-film elements which cannot be employed in arrays of the prior art due to variations in magnetic characteristics among the individual elements.

Accordingly, it is an object of this invention to utilize in a single device, a plurality of magnetic thin-film elements which could not be satisfactorily employed previously in such a device due to differences in their magnetic characteristics.

Another object is to provide a magnetic thin-film type structure suitable for use in magnetic memory devices, in which the allowable margin of information current which can be satisfactorily employed is increased.

Figure 1:
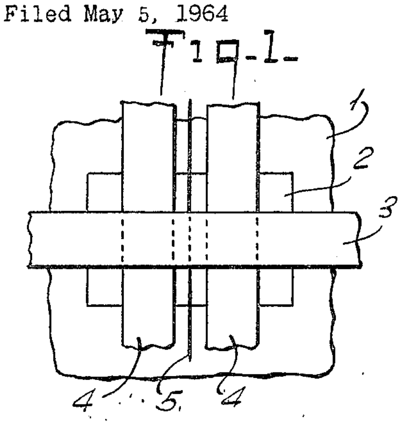
Figure 2:
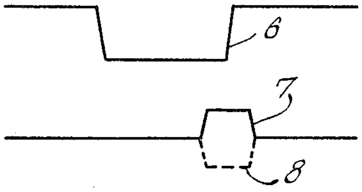
Figure 5:
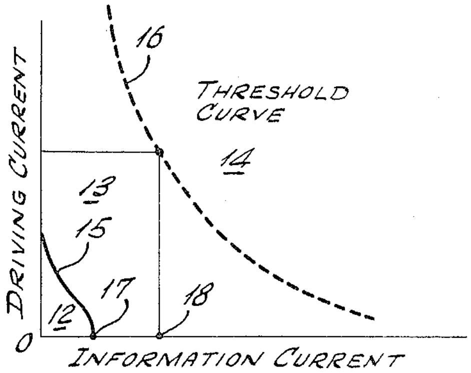
Figures 3, 4, 6:
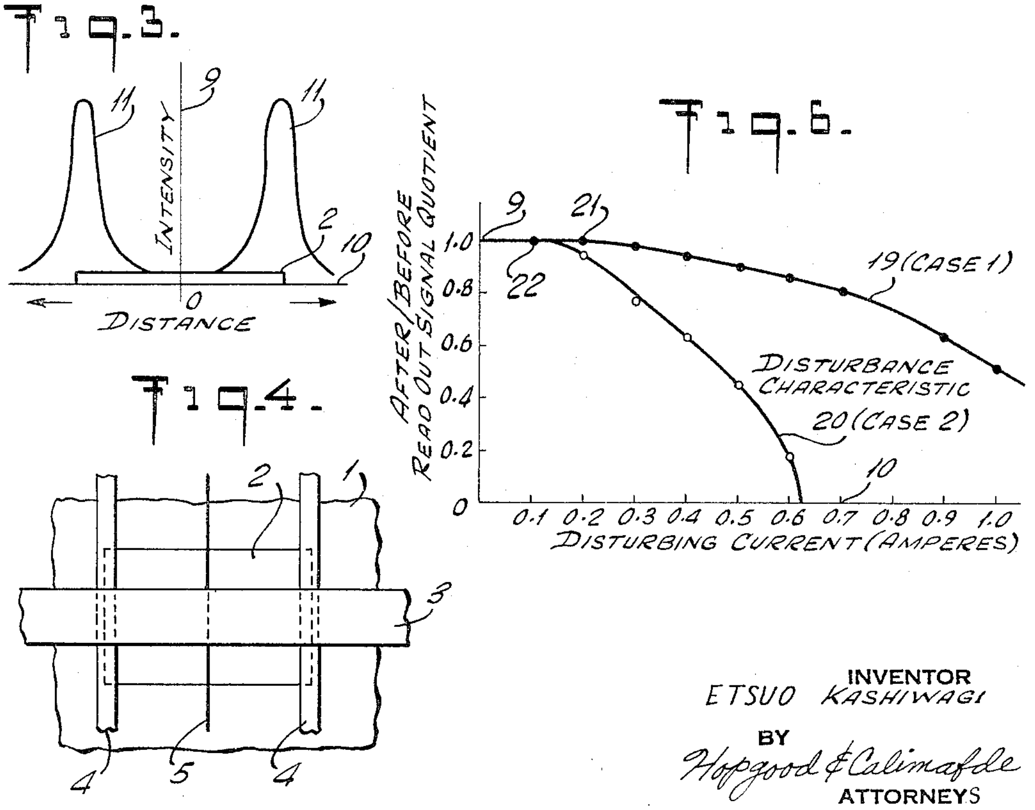
Figure 7:
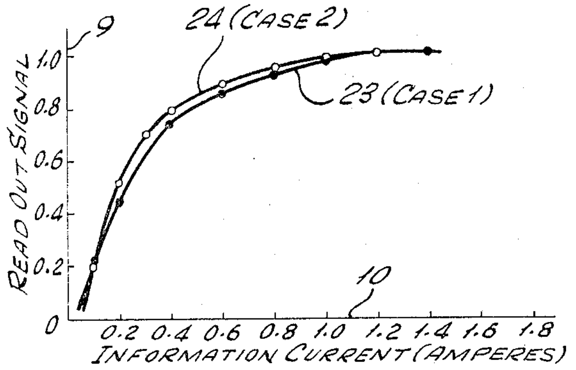
Figure 8:
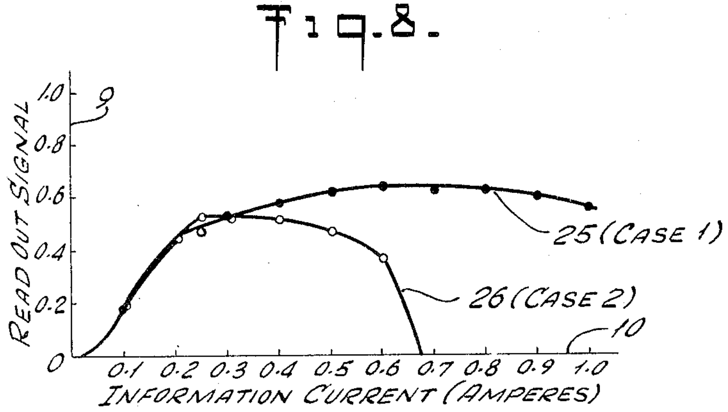
Figure 9:
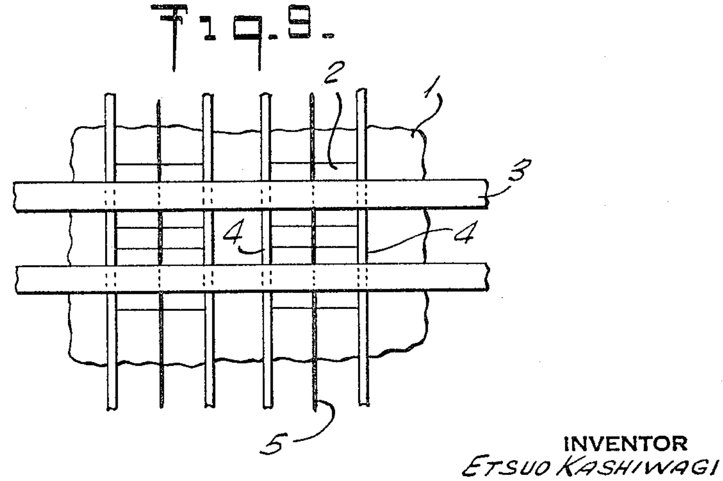

All of the objects, features and advantages of this invention and the manner of attaining them will become more apparent and the invention itself will be best understood by reference to the following description of an embodiment of the invention taken in conjunction with the accompanying drawing, in which FIG. 1 is a plan view of an arrangement which includes a magnetic thin-film memory element, a drive line, an information line, and a sense line, FIG. 2 illustrates the waveforms of the drive current and the information current for the drive line and the information line, respectively of FIG. 1, FIG. 3 is a schematic diagram showing the distribution of the information magnetic field on the magnetic thin-film memory element according to the invention, FIG. 4 is a plan view showing an embodiment of the invention which utilizes a magnetic thin-film element, FIG. 5 is a graph showing the threshold curves relating to the drive current and the information current for the magnetic thin-film element of FIG. 4, FIG. 6 shows the disturbance characteristic curves of the magnetic thin-film element of FIG. 4, FIG. 7 shows the write-in characteristic curves of the magnetic thin-film element of FIG. 4, FIG. 8 shows the over-all characteristic curve of write-in and disturbance, for the structure of FIG. 4, and FIG. 9 shows a plan view of an embodiment in which the present invention is applied to an array of magnetic thin-film memory elements.

In accordance with the invention, a structure is provided which utilizes an improved positional relation between an information line and a magnetic thin-film element to increase the allowable margin of useful information current for the magnetic element, and also to provide an improved intensity distribution of the information magnetic field on the magnetic element which is obtained by sending the information current to the information line. The invention further contemplates a magnetic thin-film memory array which employs a plurality of such structures.

Referring now to FIG. 1, there is shown a magnetic thin-film element 2 formed, for example, by vacuum evaporation for electrodeposition on a substrate 1 and adapted to serve as a memory element. The numerals 3 and 4 indicate respectively a drive line and information lines. FIG. 2 shows the wave forms of the electric current to be sent through these lines in order to write or store an information on the magnetic thin-film element 2 and to read the written information, under the positional relation between this element and each line shown in FIG. 1. Referring to both FIGS. 1 and 2, the drive line 3 represents the flow of drive current 6 and the lines 4 represent information lines for the flow of information current, the numeral 7 representing an information current of "0" and the numeral 8 an information current of "1." Another line 5, which is a sense line, is used for reading to discriminate information that is written in the magnetic thin-film element 2.

The objects of the invention are accomplished, as will become clear from FIGS. 3–9, and the description relating thereto, by arranging the information lines 4 on the magnetic thin-film element 2 in such a manner that the maxima of the information magnetic field on the magnetic thin-film element 2 may be located, when the information current 7 or 8 is sent through the information line 4, at the ends of the magnetic thin-film element 2, or adjacent these ends. In accordance with the invention, conductors having a small width or diameter are employed as the information lines 4 so that the information magnetic field may be confined or localized as much as possible.

FIG. 3 shows a schematic representation of the distribution of the information magnetic field on the magnetic thin-film element 2 in accordance with the invention, in which the ordinate 9 indicates the intensity of the information magnetic field, and the abscissa 10 indicates the distance from the center 0 of the magnetic thin-film element 2 toward the ends thereof. The numeral 11 indicates the distribution of intensity of the information magnetic field on the magnetic thin-film element 2.

FIG. 4 is a plan view of an embodiment of the above described arrangement in accordance with the invention, in which strip lines 4 having a narrow width are used as the information lines and placed as close as is feasible to the ends of the magnetic thin-film element 2.

When a plurality of magnetic thin-film elements 2 are used as memory elements in a memory device, inasmuch as the information currents 7 or 8 as shown in FIG. 2 flow into all of the memory elements besides the one intended to write information at any given time, it is required that the written information for each element be disturbed as little as possible by the flow of the information current 7 and 8. It is also necessary that information can easily be written whenever the information current 7 or 8 flows in coincidence with the driving current 6 seen in FIG. 2. Here, the term "the margin of information current" means such range of amplitude of the information current 7 or 8 for all of the memory elements of a memory device that the writing of the information "0" or "1" is performed readily when the drive current 6 flows in coincidence with the information current 7 or 8, and also that when only the information current 7 or 8 flows repeatedly the written informations are virtually undisturbed.

FIG. 5 shows the threshold curve relating to drive current and information current for the magnetic thin-film element 2, in which the abscissa indicates the amplitude of information current 7 or 8, while the ordinate indicates that of the driving current 6. This threshold curve is composed of the region 12 of such electric current amplitudes by which current the magnetization vectors of the magnetic thin-film elements 2 are not switched at all (herein also referred to as the no-switch region 12), the region 13 of such electric current amplitude by which current the magnetization vectors of the magnetic thin-film element 2 are locally switched (herein also referred to as the non-uniform region 13), and the region 14 of such current amplitudes by which the whole magnetization vectors of the magnetic thin-film element 2 are switched completely (herein also referred to as the uniform region 14). The boundary curve 15 indicates the boundary between the no-switch region 12 and the non-uniform region 13. Another curve 16 is the boundary curve between the non-uniform region 13 and the uniform region 14. Point 17 (which represents the horizontal coordinates of the crossing point of the abscissa and the boundary curve 15) expresses the threshold current relating to the information current. The minimum information current amplitude 18 necessary to have the magnetization vectors of the magnetic thin-film element 2 switched completely (i.e., to perform the complete writing), when the information current flows in the information line 14 in coincidence with the driving current $I_{R-W}$ having a certain amplitude in the time relation as indicated in FIG. 2, is determined by the boundary curve 16.

As already explained, when using a plurality of magnetic thin-film elements as memory elements for a memory device, it is generally considered that an information current larger than the threshold current relating to the information current is now allowable from the viewpoint of preventing the disturbance of written information in the magnetic thin-film element 2 due only to information current.

Now, let the case wherein the arrangement of this invention as shown in FIG. 4 be called Case-1, and the case wherein the positional relation between the magnetic thin-film element 2 and the information line 4, as shown in FIG. 1, be called Case-2. In Case-1, even if an information current having an amplitude up to approximately twice that of the threshold current $I''_0$ relating to the information current in Case-2 flows repeatedly, the information which is written previously is not at all disturbed. In other words, the threshold current $I'_0$ in Case-1 is much larger than the threshold current $I''_0$ in Case-2. Moreover, comparing the rate at which the information written previously is disturbed by the repeated flow of an information current larger than the threshold current, such rate is very low in Case-1 whereas it is extremely high in Case-2. Thus it is seen that when the arrangements of this invention are employed in a magnetic thin-film memory device, the result is that the allowable margin of the information current becomes substantially greater.

FIG. 6 shows curves, referred to as disturbance characteristic curves. Such curve indicates the relation between the amplitude of a disturbing electric current and the rate at which the information "0" (or "1"), previously written, is disturbed when this disturbing current, i.e., the information electric current of "1" (or "0"), is repeatedly sent through a magnetic thin-film element writing the information "0" (or "1"). The abscissa 10 of FIG. 6, indicates the amplitude of a disturbing electric current in amperes while the ordinate 9 represents the quotients obtained by dividing the peak value of read out signal for "0" (or "1") after disturbance, by the value before disturbance. Furthermore, the curve 19 indicates the disturbance characteristic curve for Case-1 while the curve 20 indicates the disturbance characteristic curve for Case-2. The horizontal coordinates of point 21 represent the threshold current $I'_0$, while those of point 22 represent the threshold current $I''_0$. From FIG. 6, it will be understood that the threshold current $I'_0$ in Case-1 is approximately twice as large as the threshold current $I''_0$ in Case-2.

FIG. 7 represents curves, referred to as write characteristic curves which indicate the relation between the amplitude of an information current for "0" (or "1") and the rate at which informations "0" (or "1") are written by the information current during performance of the writing operation for the magnetic thin-film element 2. The abscissa 10 in FIG. 7, indicates the amplitude of an information electric current for "0" (or "1") in amperes while the ordinate 9 indicates the peak value of read out signal immediately after the writing of the information "0" (or "1") by arbitrary scale. Furthermore, the curve 23 indicates the write characteristic curve for Case-1 and the curve 24 indicates the write characteristic curve for Case-2. From FIG. 7, it will be understood that the write characteristic curve of Case-1 is almost identical to that of Case-2.

FIG. 8 shows curves, referred to as overall characteristic write and disturbance curves, which indicate the relation between the peak value of read out signal of the information "0" (or "1") and the amplitude of information current for "0" (or "1") when an information signal having the same amplitude as that of the information electric current for "0" (or "1") is repeatedly sent through the information line after writing the information "0" (or "1"). In FIG. 8, the ordinate 9 represents the value of read out signal by arbitrary scale while the abscissa 10 represents the amplitude of the information current for "0" (or "1") in amperes. The curve 25 is the overall write and disturbance characteristic curve for Case-1 while the curve 26 is the overall write and disturbance characteristic curve for Case-2.

Besides the advantages already mentioned, this invention has the further advantage that the eddy currents generated in the information lines are so small that there is no reduction of rise time of the driving magnetic field formed by sending the drive curent 6 through the drive line 3 because the diameter or width of the information lines 4 are small and these lines 4 are separated from the sensing line 5.

FIG. 9 shows an embodiment of the invention which utilizes the structure of FIG. 4 in an array of magnetic thin-film memory elements 2 in which the drive line 3 is provided on both sides of the substrate 1 across the magnetic thin-film element. The sensing line 5 is also provided on both sides of the substrate 1 and each such line 5 is so positioned as to cross at right angles with the drive lines 3 at the central part of the magnetic thin-film element 2. Additionally, the information lines 4 are provided on both sides of the substrate 1 and each of these lines is so positioned as to run parallel to the sense lines 5 and to cross at right angles with the driving lines 3 at the ends or adjacent to the ends of the magnetic thin-film element. Each information line 4 comprises a strip line or narrow width so that the information magnetic fields obtained by passing the information current through the information lines 4 may be locally confined as much as possible. The arrangement of FIG. 9 depicts a memory device of two words each comprising two bits, i.e., one of four bits.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An improved magnetic memory element structure for storing information comprising a substrate, a thin-film of magnetic material of generally rectangular shape on said substrate, said film having discrete boundaries, a drive current line disposed along one axis of said film for receiving a drive current, a pair of information current lines disposed substantially perpendicular to said drive current line, said information lines being disposed parallel to one another and located adjacent said film at two opposed edges thereof, said information current lines being adapted to receive information current to store information on said film and also to read said stored information, and a sense line for discriminating said stored information during readout, said sense line being positioned between said information current lines.

2. The invention described in claim 1 wherein said information current lines each have an extremely narrow width compared with the distance between them, whereby the magnetic impressions of information current are confined to the local regions adjacent said opposed edges of said film.

3. The invention described in claim 1 wherein said sense line is located midway between said information lines.

4. The invention described in claim 1 which further includes another drive current line positioned on the opposite side of said film from the first drive current line and substantially parallel thereto, another pair of information current lines positioned on the opposite side of said film from the first pair of information current lines and disposed in opposed relation thereto, and another sense line on the opposite side of said film from the first sense line and substantially parallel thereto.

5. An improved magnetic thin film memory array for storing information comprising a substrate, a plurality of discrete areas of thin film magnetic material on said substrate, each of said areas being of generally rectangular shape of substantially the same size and being arranged in a row, a separate drive current line associated with each of said areas, each drive current line being disposed centrally of an area and along an axis thereof, each of said drive curent lines being substantially perpendicular to said row and substantially parallel to one another, a pair of information current lines disposed parallel to said row, said information current lines being located adjacent opposed edges of each of said areas, said information lines each having an extremely narrow width compared to the distance between them, whereby information current stores information on said areas by means of magnetic impressions which are confined to the local regions adjacent said opposed edges, and a sense line linking each of said areas for discriminating said stored information during readout, said sense line being positioned between said information current line.

References Cited

UNITED STATES PATENTS 3,293,620 11/1961 Renard ------------ 340—174

BERNARD KONICK, *Primary Examiner.*

V. P. CANNEY, *Assistant Examiner.*